Dec. 5, 1967  F. W. MILLER ET AL  3,355,783
SHUTTLE KILN
Filed July 30, 1964  6 Sheets-Sheet 1
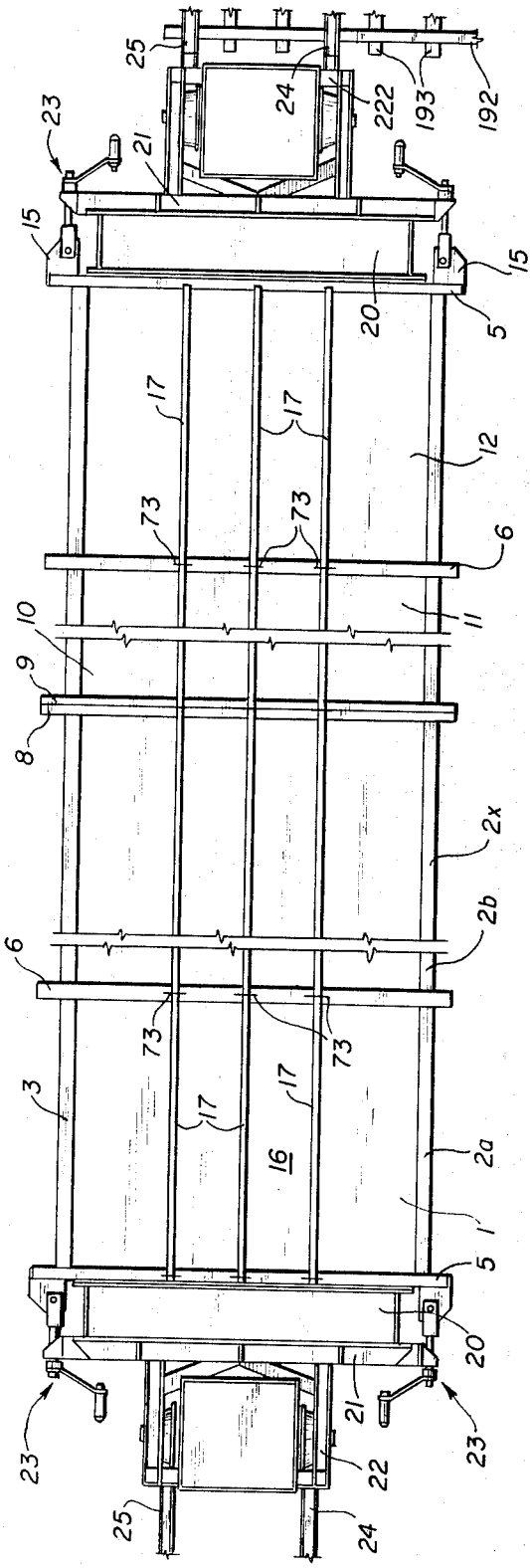
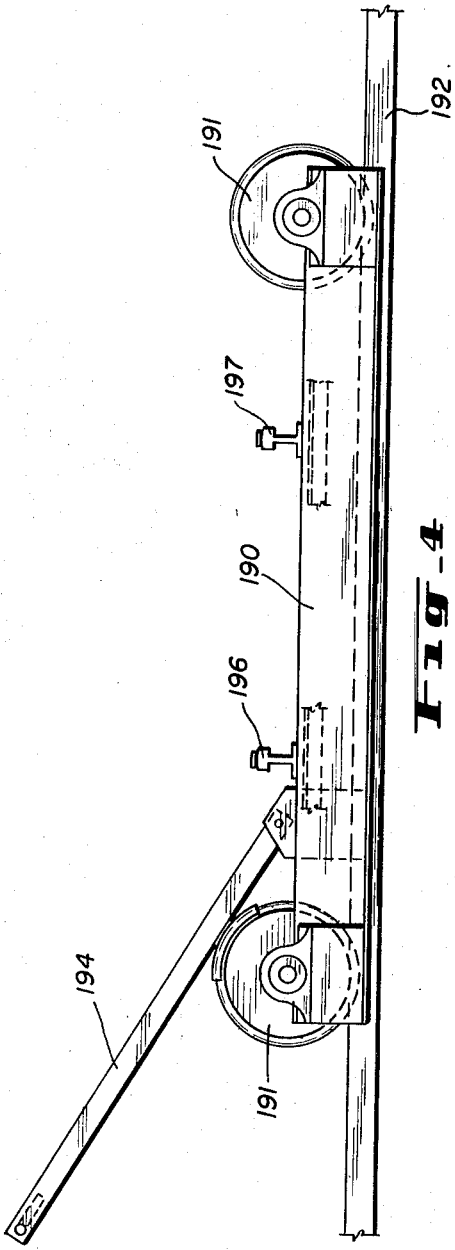
INVENTORS.
Fred W. Miller
Frederick E. Blair
BY
*McGrew and Edwards*
ATTORNEYS

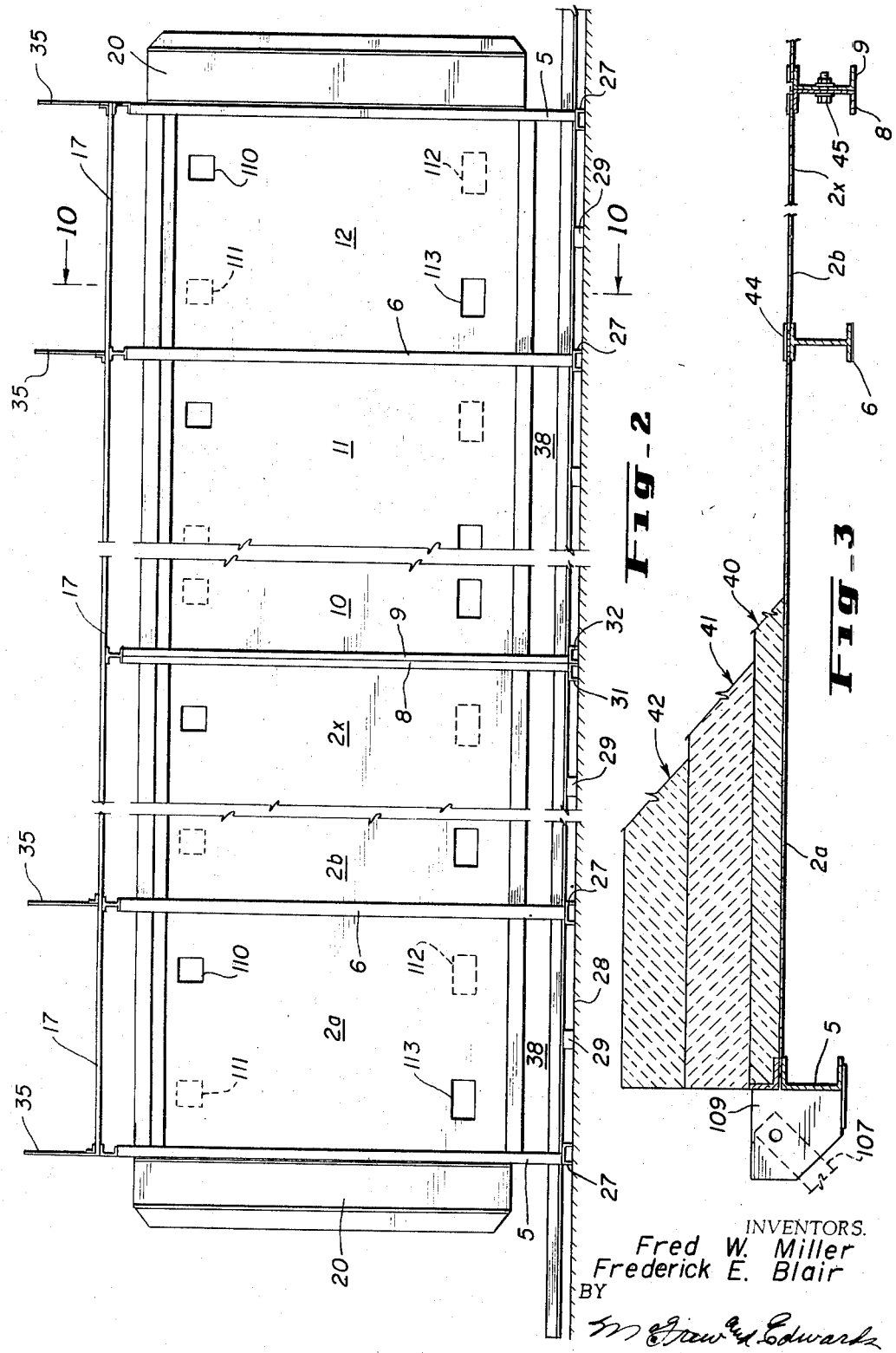

Dec. 5, 1967   F. W. MILLER ETAL   3,355,783
SHUTTLE KILN
Filed July 30, 1964   6 Sheets-Sheet 3
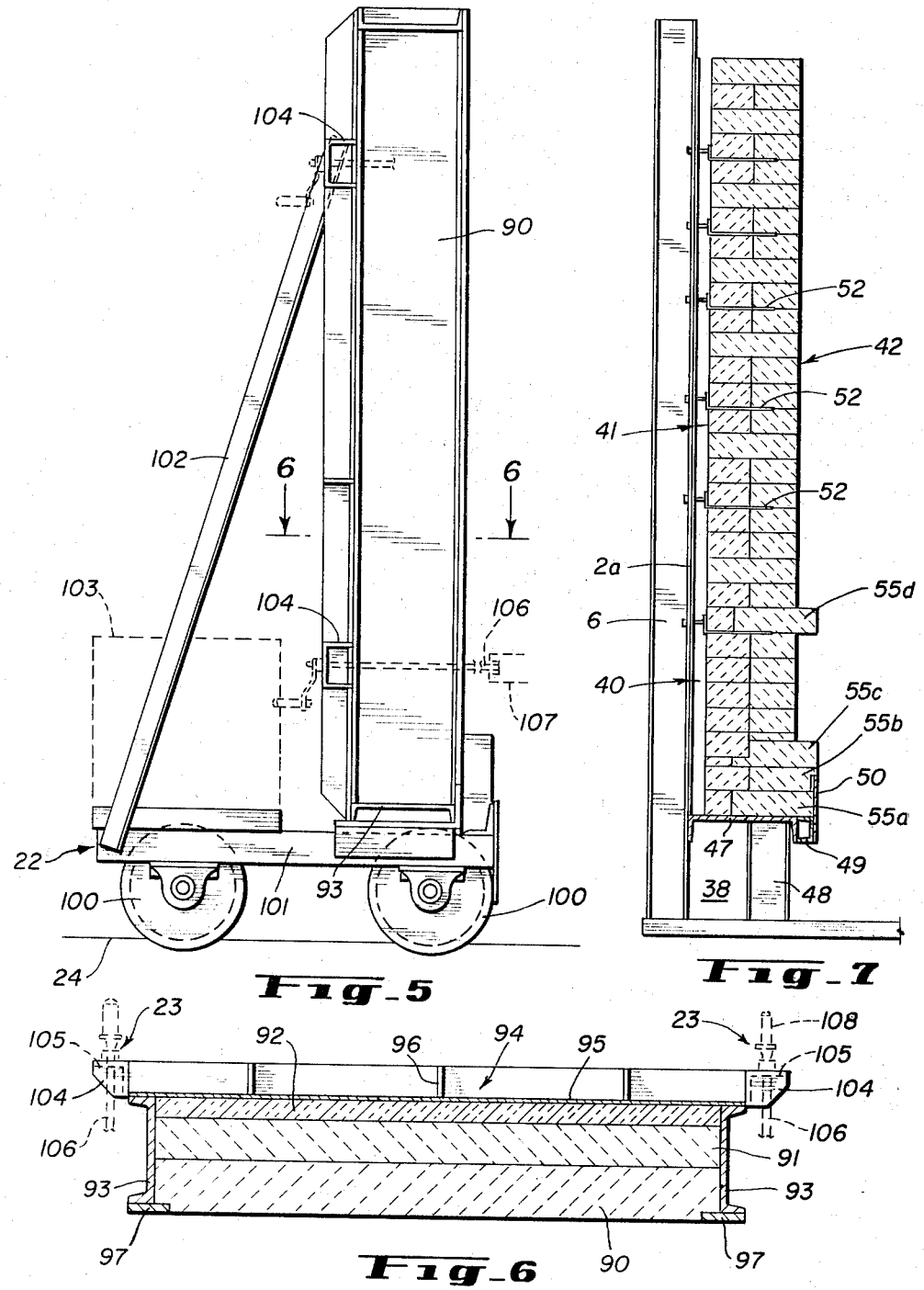
INVENTORS.
Fred W. Miller
Frederick E. Blair
BY
McGrew & Edwards
ATTORNEYS Dec. 5, 1967  F. W. MILLER ET AL  3,355,783
SHUTTLE KILN
Filed July 30, 1964  6 Sheets-Sheet 4
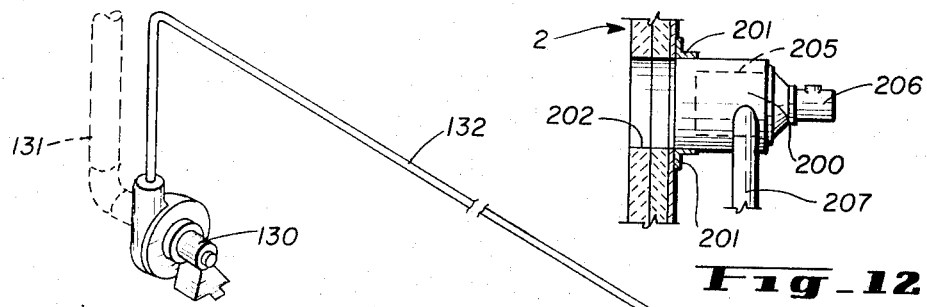
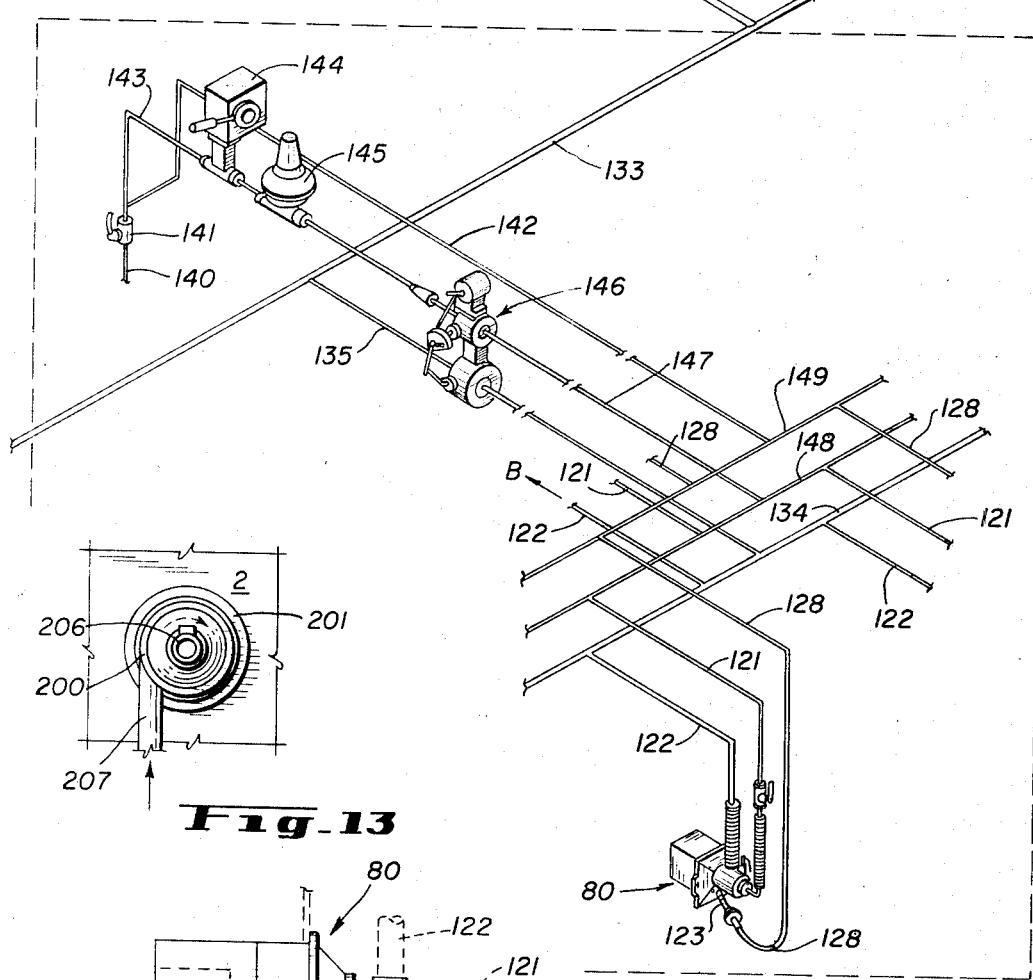
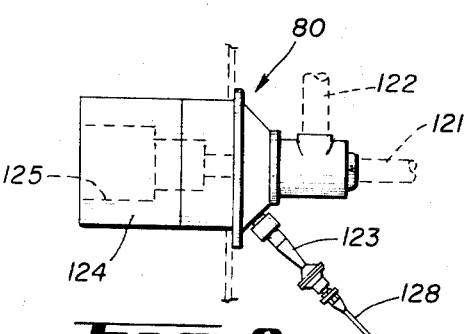
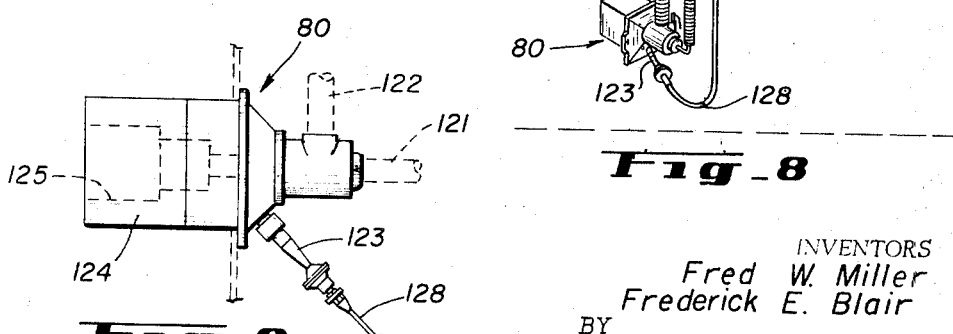
INVENTORS
Fred W. Miller
Frederick E. Blair
BY
ATTORNEYS

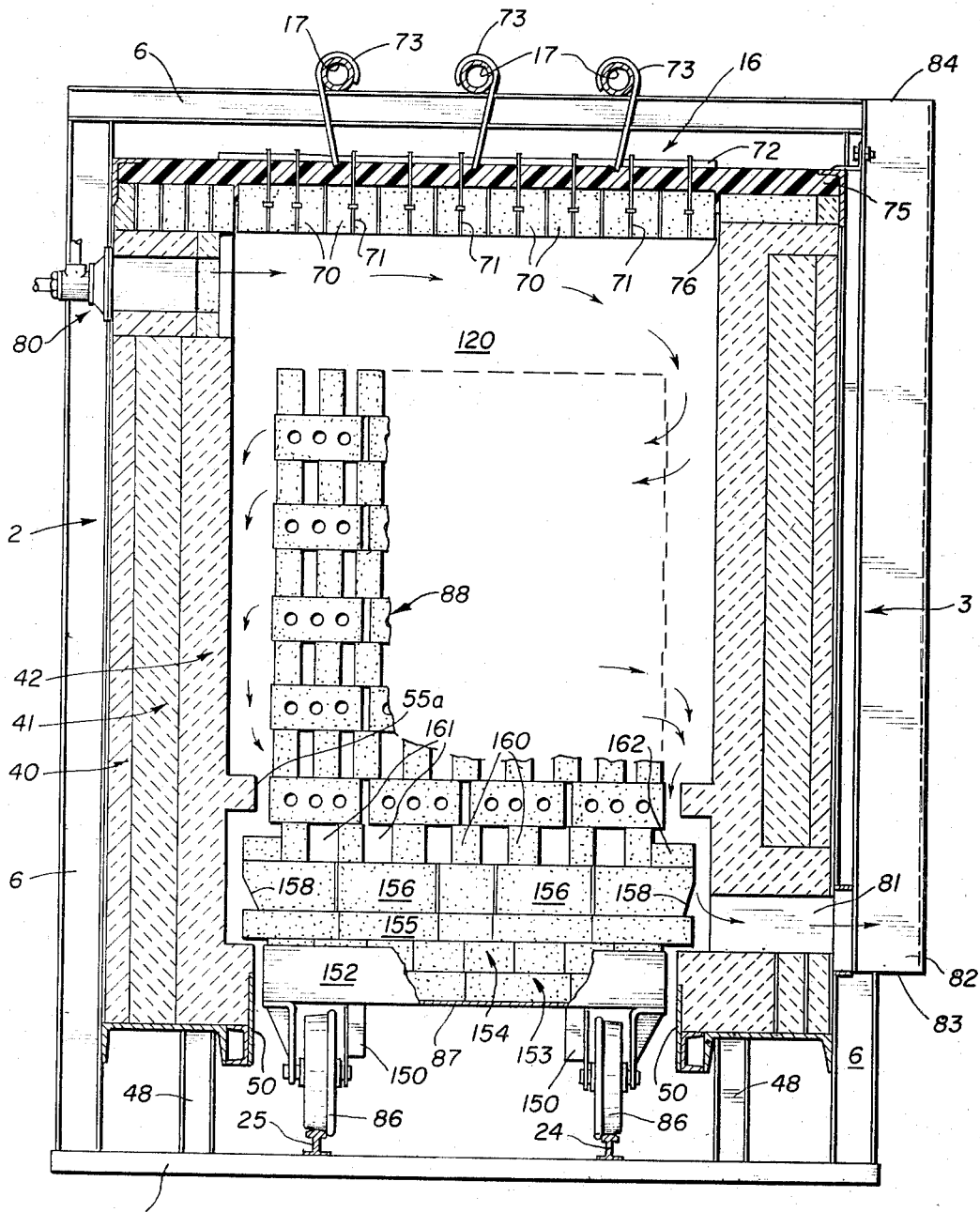
Fig_10

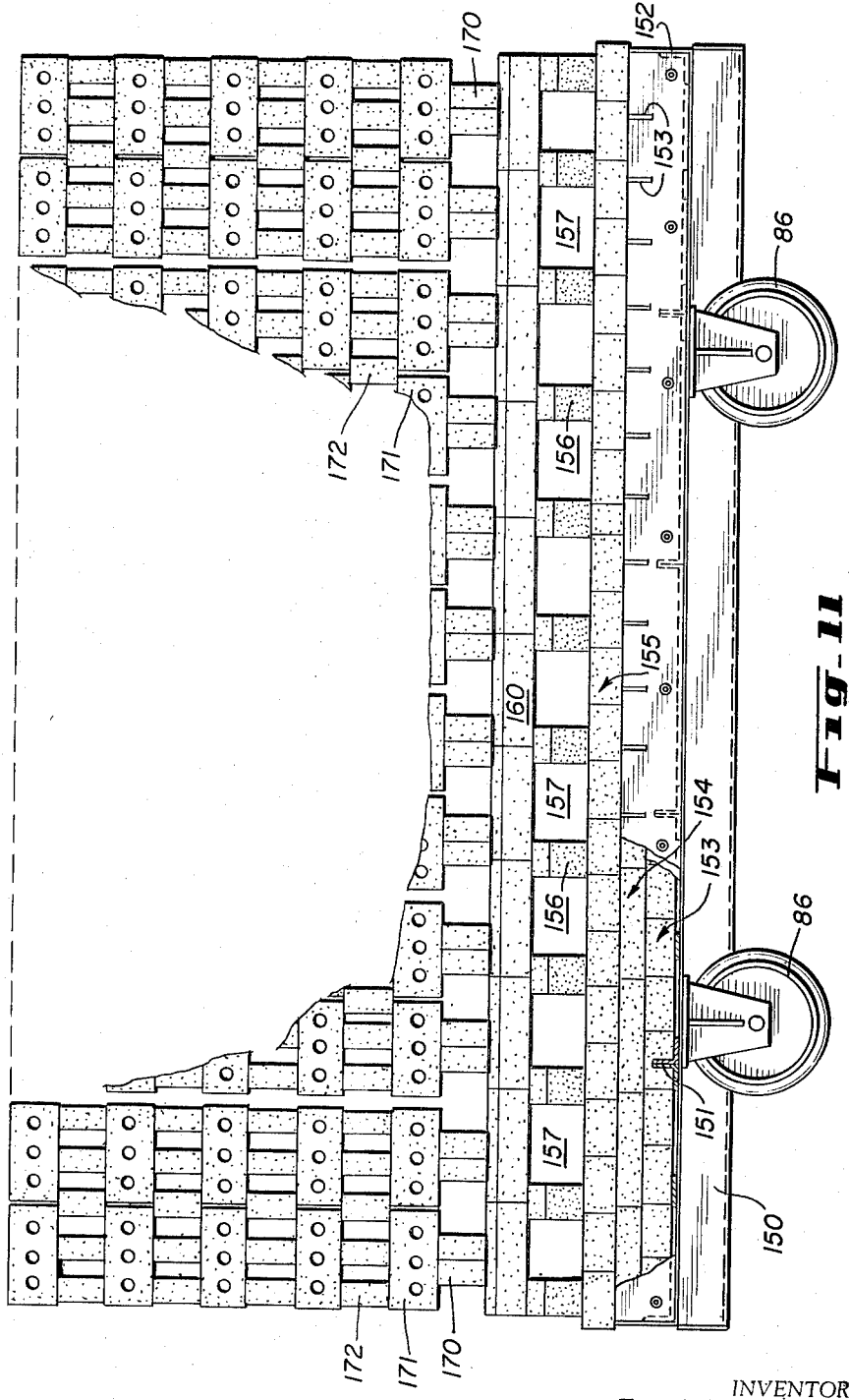

3,355,783
SHUTTLE KILN
Fred W. Miller, Albuquerque, N. Mex., and Frederick E. Blair, Denver, Colo., assignors to M.K.B. Industries, Inc., Denver, Colo., a corporation of Colorado
Filed July 30, 1964, Ser. No. 386,137
18 Claims. (Cl. 25—142)

This invention relates to kilns and more particularly relates to improvements in shuttle-type brick kilns and the loading and positioning of the cars in such kilns.

A few shuttle kilns have been recently used in the periodic firing of small batches of bricks. In general, shuttle kilns have been made on the order of car tunnel kilns, with an elongated chamber for housing a series of brick loaded cars which are mounted on tracks in the bottom of the kiln. Firing of such kilns is provided by burners spaced along the outside walls of the kiln generally along the level of the bottom of the lowermost bricks on the cars, and with a central floor flue similar to the furnace zone of car tunnel kilns. Arched roofs in these kilns are utilized to reflect the heat in the kiln onto the bricks mounted on the cars. One form of shuttle kiln utilizes two side by side trains of cars. The cars are provided with a layer or two of firebrick for insulation and on which are put green bricks for the firing. The construction of the tunnel and the cars permits the use of a sand seal which requires a plate on the car running in a sand filled trough. This seals the upper part of the car and its load of bricks in the kiln while keeping the lower part or truck of the car away from the high heat used for firing the bricks. With such kilns, blowers or the like on the exhaust flue are needed to exhaust gases from the kiln to control pressure inside the kiln.

According to the present invention we have provided a single width car shuttle kiln of modular construction which is readily movable from point to point and which is a highly efficient and economical construction. The side walls of the kiln are open at the bottom, leaving a free circulation of air around the car trucks or undercarriages. The roof of the kiln is flat and is suspended from top buckstay tie rods forming a combustion chamber above the brick loads. The kiln includes an outside metal sheath and plural layers of fire and insulating bricks internally to insulate the kiln from the steel walls. A unique top to bottom cross firing uniformly and efficiently heats and cools the latticed brick loads in a greatly reduced time schedule. The kiln is provided with a modular construction and each module is arranged to house two brick cars. The modular construction provides means for quickly and easily expanding or reducing the size of the kiln according to the needs of the brick plant. Each modular section is provided with its own heat controls so that different types of bricks may be fired in each modular unit, using different heating and cooling schedules, providing a highly efficient firing for a high recovery of quality bricks. Additionally, novel flues are provided which eliminates the need for forced draft, yet provides for positive pressure in the kiln and effectively evacuates the spent gases from the kiln. The kiln is arranged to be built inside the building to provide all-weather operation.

The unique structure of the kiln and associated cars eliminates the need for a sand seal between the cars and the walls, thereby reducing structural elements from the construction. The structure and the modular form of the kiln provides an essentially movable kiln which is readily moved or an existing kiln expanded where desired, with a minimum disruption of the piping and associated structure for such kilns.

Included among the objects and advantages of the present invention is a modular kiln which is arranged in widths for one car and each modular section is the length for two cars. The kiln is provided with a top combustion chamber, and with a unique top to bottom hot gas circulation to provide a uniform temperature throughout each modular section for efficient firing of the bricks on the cars in the kiln.

Another object of the invention is to provide a novel kiln assembly utilizing method of firing the kiln wherein a top combustion chamber and top to bottom opposed hot gas paths uniformly fire the load of bricks on each car.

A further object of the invention is to provide lightweight kiln construction which has an open bottom and includes refractory material secured to metal backing in modular sections supported on buckstays to provide a simplified and readily moved kiln.

Yet another object of the invention is to provide a novel construction of kiln and associated brick carrying cars which eliminate sand seals between the two and still provides means for assuring the positive pressure in the kiln during firing.

Still another object of the invention is to provide a novel flue construction eliminating forced or induced drafts by mechanical means and provides natural circulation in the kiln for uniform firing of the bricks therein.

A still further object of the invention is to provide an efficient shuttle kiln for brick loaded cars providing a novel method of operation on a reduced time schedule and with controlled heating and forced cooling.

These and other objects and advantages of the invention may be readily ascertained by referring to the following description and appended illustrations in which:

FIG. 1 is a top plan view of a kiln according to the invention showing the modular construction and the movable doors closing each end thereof;

FIG. 2 is a side elevational view of the kiln, without the end doors, and indicating the modular construction of the kiln;

FIG. 3 is a schematic, cross-sectional detail of a side wall of the kiln, according to the invention, showing the relation of the metal sheath, insulating and refractory material and the buckstays for holding the unit together;

FIG. 4 is a side elevational view of a door transfer car;

FIG. 5 is a side elevational view of a truck mounted kiln door;

FIG. 6 is a schematic cross-sectional view of the kiln door taken along section line 6—6;

FIG. 7 is a cross-sectional view of a kiln wall showing its construction;

FIG. 8 is a schematic typical piping diagram providing fuel and air to each modular unit;

FIG. 9 is a detail view of a burner structure;

FIG. 10 is a cross-sectional view through the kiln with a positioned brick loaded car;

FIG. 11 is a side elevational view of a brick loaded car and the configuration of bricks;

FIG. 12 is a cross-sectional view of a modifier burner; and

FIG. 13 is an end elevation of the burner of FIG. 12.

The following description is directed to a typical kiln, shown in the drawings, and is intended for illustration only and not for purposes of limiting the invention to the precise details.

The kiln, FIGS. 1 and 2, consists of a series of modular units each of which is composed of four segments. The modular unit may be connected to other modular units to form various sizes of kilns as desired. The left end segment includes side walls 2a and 3, an end buckstay 5 and an intermediate buckstay 6. In the form shown, four of such segments are joined together with intermediate buckstays 6 forming a modular unit. Each end of a four segment unit has a partial buckstay 8, in this case a channel, which is arranged to be connected to partial buckstay 9, another channel, of the next segment. The two partial buckstays make a built-up I-beam. The modular units are thus joined together by the partial buckstays similar to 8 and 9. The intermediate buckstays 6 join the segments and hold the modular unit together. The opposite end segment 12 is provided with an end buckstay 15.

The top 16 of the segment 1 is supported by pipes 17 which extend along the top of the kiln and are secured to the buckstay tie rods 6, as explained in detail below. An end segment 20 is mounted on each end buckstay, and a door 21, mounted on a carriage 22, is arranged to close the opening in the end member 20. The door is held in position by lugs 23, explained in detail below. The carriage 22 is mounted on rails 24 and 25, which generally pass through the furnace for supporting brick carrying cars. At the opposite end of the kiln another door 21 is arranged to close the opening in end panel 20.

Each intermediate buckstay is supported on a lateral channel 27 which is mounted on the floor or foundation 28 in the location for the kiln. Intermediate ties 29 are arranged along the kiln and these along with the channels support the tracks. At the joint between the modular sections, the buckstay 8 is mounted on channel 31 and the buckstay 9 is mounted on channel 32 which are assembled back to back. Mounted on each buckstay and extending thereabove is a pipe support 35 for supporting the piping for the gas, air, electrical units and the like above the kiln. The side walls terminate above the bottom of the buckstays leaving an open space 38 below the wall of all the sections.

The modular units may be attached together in any number. The two cars which fill the modular unit are provided with a separate zone. Thus for a four-zone kiln, which holds eight brick cars, four modular units are arranged end to end. For a six-zone, twelve-car kiln, six modular units are needed.

In one efficient size, the kiln length is 68 feet and the eight-car total length is 67 feet 5 inches. Thus the eight-car kiln has about a seven inch difference in the length of the kiln and the car, illustrating the close fit. With the six-zone twelve-car kiln, the total length of the kiln is 102 feet and the total length of cars is 101 feet 2 inches, making a difference of about 10 inches.

In FIG. 3 a typical section through a kiln side wall is shown. A steel plate 2a is supported between intermediate buckstay 6 and the end buckstay 5, being welded or otherwise secured thereto. First an insulation layer 40 is provided next to metal plate 2a, then a layer of insulating firebrick 41 and finally another layer of either standard firebrick 42 or additional insulating firebrick, the bricks are illustrated in detail for clarity. Attached to the buckstay 6 is a second plate 2b, for the next segment of the kiln, which is welded in place, and clips 44 over the joint are welded to both plates 2a and 2b to hold the same in place. The segment side is continued in the same manner and, as stated above, for each modular section four such plates are necessary. In FIG. 3, the plate 24 indicates a plate further along down the side which is welded to buckstay portion 8. The partial buckstay 8 is bolted by means of bolts 45 to buckstay part 9 forming an I-beam. Attached to each metal wall section is the insulation and the firebrick. Between the brick joints of adjacent modular sections, insulating material is packed providing for expansion while insulating the metal plates and buckstays at the joint.

The cross-sectional view, FIG. 7, shows the general arrangement of a typical side wall and its construction including the ties to the buckstay. The bricks are held above the ground by means of a channel 47 which is welded or otherwise secured to the buckstay 6. The outer edge of the channel is supported on a short standard 48. A series of these standards is required along the wall to support the weight of the bricks. As extension 49 is welded to the channel 47, and a bumper plate 50 is welded to the extension.

The inner insulating bricks are staggered for construction purposes. At the bottom on the first course 55a one full brick is put sidewise and a partial brick is put between it and the insulation 40 so that the full brick extends out two or three inches beyond the main line of the bricks of the wall The outer end of the brick is supported by means of the extension 49 and butted against the metal sheath or bumper 50 which protects the bricks from accidental striking by the cars The second 55b and third 55c courses of brick extend out the same distance as the first course of bricks to provide a seal with a car, as shown in FIG. 10. Such construction may require partial and cut bricks for the configuration, such as those shown. On the eighth course 55d a full brick and a partial brick are spaced so that the full brick sticks out a few inches from the wall a distance which is slightly less than the full distance of the first three courses. This brick course provides a baffle for the flow of flue gases at the bottom course of bricks on the car.

The insulating bricks are held in position by means of wall ties 52 spaced along the vertical extent of the wall, secured through the insulating section 40 into the buckstay 6. The ties may be conventional for holding bricks in position against a buckstay. The plate 2a provides backing for the firebricks, and provides strength for the unit during movement.

The top of the kiln is shown in cross-section in FIG. 10 where the buckstay-tie rod combination 6 is shown to be substantially a U-shaped member with the metal side walls 2 and 3 attached to the upright members of the U and the top 16 secured to the tie rod portion of the buckstay. The top includes a plurality of firebricks 70 which are mounted on hangers 71 which in turn are suspended on lateral pipe supports 72 extending across the top of the kiln. The pipes 72 are suspended by means of hangers 73 on the upper tubular supports 17. A plastic or other type of insulation 75 is placed above the bricks to complete the roof. Fiber insulation is packed in the joints 76 at each side between the roof firebricks and the side wall firebricks permiting expansion and contraction.

A burner 80 is placed in an upper position in the side wall, explained in detail below, and is arranged to provide a flow of hot gases into the bricks on the car in the kiln. An outlet flue 81 is provided in the bottom of the wall opposite the burner and the flue leads to an open sheet metal flue 82, open at its bottom 83 and at its top 84. The flue 82 is a rectangular flue and generally not higher than the kiln.

A brick car 85 is shown in FIG. 10 in position in the kiln, and the construction of the car will be explained below. In general, however, the car includes wheels 86 depending from a platform 87 on which is placed insulating layers of firebrick. The load of green bricks 88 is stacked in a lattice on the firebricks. The courses 155 and 156 include projections for sealing against complementary projections in the wall of the kiln.

The end of the kiln are closed by means of a door, shown in detail in FIGS. 5 and 6. The door includes two layers of insulating or firebrick 90 and 91 backed by a layer of insulation 92, all mounted together in a frame 93 which extends around the periphery of the firebrick; the brick is not shown in detail for clarity. A backing frame 94 includes a metal plate 95 and a series of perpendicular supports 96 secured to the plate for holding the refractory rigid. The firebricks are held in the frame 93 by means of plates 97 which, also, provide a bumper and a seal with a complementary plate in the end member 20, not shown in detail.

The reinforced refractory door is mounted on a truck 22 which includes wheels 100 journaled on a frame 101. A diagonal brace 102 supports the door in its upright position and a ballast box 103 is arranged to be filled with ballast to balance the door on the truck and prevent it from tilting forwardly. Attached to the back 94 at four points is a channel member 104, upper and lower positions on both sides. Each channel is slotted at 105 in its front face to receive a bolt 106 secured in a yoke 107. Each yoke 107 is arranged to be pivotally attached to one of four brackets 109 mounted on end buckstays 5, FIG. 3. The bolt 106 has a nut-handle combination 108 mounted thereon. Each bolt and nut is arranged to pivot on bracket 109 and fit in its corresponding notch 105 so that the door can be pulled tight against the end extension 20 of the kiln by a four-point fastening.

The burner-exhaust system is shown in FIG. 2 where each segment is provided with two burners and two outlets. Each modular unit has four burners and four outlet flues. As in segment 2a, a burner is provided in the opening 110 in the upper right-hand corner of the wall and a burner is provided in the opening 111 in the opposite wall diagonally across in that segment. An outlet 112, similar to outlet 81 shown in detail in FIG. 10, exhausts gases from the burner in opening 110 into an upright flue, not shown in FIG. 2 but similar to the one identified as 82 in FIG. 10. On the opposite side of the segment another outlet 112 exhausts to a similar flue. Thus each segment has two burners and two outlets.

The burners and the flue outlets are so arranged that the combustion products cross from top to the bottom throughout the segment into the outlet. Flame and gases are introduced into the combustion chamber 120 at a high velocity and impinge on the opposite wall. A considerable quantity of the gases is deflected through the load of bricks to the opposite wall and back through the load at a lower level and subsequently to the outlet. The general path of the combustion products is shown in FIG. 10 where the burner 80 ejects flame and products of combustion into a combustion chamber 120. The high velocity of the flame and gases pressurizes the kiln. The circulation of the combustion gases impinging against the opposite walls and circulating through the bricks on the car, produces a uniform temperature in the module and throughout the latticed bricks on the cars in the module. Natural circulation up the flues is adequate for exhausting spent gases and still permit pressurizing of the kiln. In each module of four segments there are eight burners and eight outlets. A control system for the temperature is provided in the module to control all eight burners.

Each burner, FIG. 9, includes a gas line 121, an air inlet 122 and a pilot light 123 for starting the burner. The burner is lined with firebrick 124 and provides a combustion nozzle 125 which is directed into the combustion chamber 120. The pilot is fed from a gas line 128.

In FIG. 8 a typical piping diagram is shown where a burner 80 is provided with air from an outside source 131 through a blower 130 to a main air line 132. The main air line is connected to a manifold 133 which provides air to a series of modules. The manifold 133 is cross-connected to another feeder manifold 134 for an individual module. The manifold 134 is arranged to provide air to the burners on both sides of a module of the kiln. Fuel, usually gas, for burning in the kiln is provided from a main line 140 through a main valve 144 and is divided. One line 142 provides a feed for manifold 149 for the pilots. The main fuel supply line 143 passes through a safety shutoff valve 144 through a regulator 145 into a fuel-air proportioning valve 146. The bypass line 135 of the air system, also, goes through the proportioning valve which is arranged to proportion the pressure of the gas and the air in their separate lines for burning in the burners 80. The gas leaving the proportioning valve flows through a line 147 into the manifold 148 for distribution of gas to feeder gas lines 121 connected to each burner. For the burners on the opposite side of the kiln, the take-offs for gas 121, for air 122 and for pilot light gas 128 extend toward B indicating they extend to the opposite side of the kiln. As pointed out earlier, the manifold lines are mounted generally centerwise of the kiln by means of the piping supports, and the laterals extending from the center to the burners. Each module is provided with one proportioning valve for operating the eight burners in the module. In most instances, each individual module is provided with a safety shutoff and a gas pressure regulator so that each module is completely independent. The gas and air manifolds are blocked off at the end of each kiln, so that another module may be added and its lines are easily connected into the manifold, or a completely independent system may be provided for added modules. The system depends on the number of modules already in the kiln and the number added.

The kiln cars are shown in FIGS. 10 and 11 and each includes a bottom 87 from which are mounted wheels 86. The bottom deck 87 is provided with a lengthwise channel frame 150 which strengthens the bottom deck, and a plurality of back to back channels 151, on the side opposite the channels 150, extending longitudinally of the car. Sides 152 are mounted on the bottom of the car and extend above the bottom about two courses of brick high. The side metal plates are notched at 153 in uniform intervals therealong. The ends are, likewise, notched and each notch is about one course deep. These notches provide relief for thermal expansion of the side plates due to temperature differential. The car is prepared for a load of bricks by inserting a first course of insulating firebricks 153 on the bottom plate 87. These bricks in the first course are laid sideways of the car. The next course of insulating firebricks 154 is laid lengthwise of the car. The next course of insulating firebricks 155 is set laterally of the car and it is extended two to three inches beyond the second course so as to provide a seal with the inside edge of the bottom of the wall, as shown in FIG. 10. The bricks of the courses 153, 154 and 155 are laid flat on the car, and the next course 156 is set endwise, leaving a plurality of openings 157 therebetween. Each of these edge mounted bricks is notched at 158 to provide the configuration shown in FIG. 10. The bricks of the next course 160, on top of course 156, are, also, set on their sides. The bricks of upper course 160 are not quite as wide as the course 156. The firebricks of course 160 are spaced apart to leave spaces 161 therebetween. A baffle set of bricks 162 is arranged around the edge on top of the course 156 to aid in the seal with the walls. Thus, the course 160 and the course 156 provide a latticework effect for the escape of hot gases which filter down through the bricks. There are openings, of course, from the green bricks through the course 160 into the course 156. Also, an opening between the car and the wall permits the gases to pass along the wall and to the outlet 81. The latticed load of green bricks is mounted on the cars, as for example, the bricks 170 are mounted edgewise in pairs with a second course 171 mounted thereon. Spaced apart bricks 172 are mounted in the next course thereabove, and in a similar manner from there to the top of the load. Thus, there is a space between the bricks except for the sets of two supporting bricks 170 on the first course of the bricks to be fired. The bricks are spaced apart endwise as well as crosswise so as to permit free circulation of the hot gases in the kiln through the bricks.

Since the kiln is only a single car wide, a single set of tracks passes through the kiln for the loading and unloading of cars. The doors are mounted on dollies which run on the tracks of the kiln. Since there is but a single track entering and leaving the kiln, a transfer car is provided for the removal of the door from the tracks out of the way of the opening of the kiln. Thus cars may enter or leave the kiln. A transfer car is shown in FIG. 4. The car includes a frame 190 which is mounted on four wheels 191. The car is arranged at each end of the kiln, only one rail being shown at one end. The lateral rails 192 are mounted on such ties 193 as may be necessary. A friction brake 194 pivoted from the car and riding on a wheel provides means for stopping the transfer car. A short set of rails 196 and 197 is mounted on the frame and these rails are arranged to mate with the rails 24 and 25 to permit the car door to move onto the transfer car, or to permit a car loaded with the bricks to pass over the transfer car onto the rails going into the kiln. To use the transfer car, a short length is removed from each of the rails 24 and 25, and the lateral rails 192 are placed below the main rails passing through the kiln. The transfer car is mounted on the lateral rails so as to move laterally of the kiln.

When it is desired to remove the door of the kiln, the door is released from the kiln by releasing the nut sets 23 and the door dolly is moved backwardly onto the rails 196 and 197 on the transfer car. The transfer car is then pulled along rails 192 laterally of the kiln to remove it out of alinement with the main track passing through the kiln. Another transfer car may be used to provide rails to fill the gap in the main line so that the brick cars may be moved into or out of the kiln. By using the transfer car, the heavy doors are readily pulled out of the way.

The burner illustrated in FIGS. 12 and 13 provides a novel means and method of cooling the bricks after firing. By providing heated secondary air the bricks may be force cooled. A burner housing 200 is mounted on the kiln wall by a rolled angle 201 over an opening 202 in the refractory which opens into the kiln. The mounting provides for quick and easy removal of the burner, even when the kiln is operating, for repair and replacement. With built-in burners, the kiln has to be cooled for burner removal. A burner 205 is mounted in the housing and is directed so that its flame passes the wall opening into the kiln. The burner is fed fuel, or a mixture of fuel and air, by a supply line (not shown) connected to fitting 206. A secondary air inlet 207 is tangentially mounted on the housing so that air forced into it swirls around the outside of the burner and the flame, thereby becoming heated. The hot air then circulates through the kiln and the bricks. For firing the bricks little secondary air is needed. For cooling, however, the amount of secondary air forced through the burner is progressively increased. The air forced into the kiln is thereby progressively reduced in temperature. With the increasing volume of air of decreasing temperature the bricks are subjected to force cooling—an increase in production due to decreased cooling time.

It is, of course, recognized that the burners described herein may be operated by known procedures, that is, by using a pre-mixed air and fuel combination, mixing primary air and fuel in the burner itself, and either of these two with secondary air for burning. The secondary air used for cooling is far in excess of that necessary for burning the fuel.

One size kiln which has been found particularly effective in firing bricks is a kiln which is overall slightly in excess of 6 feet in width and has a chamber about 3½ feet in width. By loading the cars with sufficient brick a 1½ foot high combustion chamber is provided above the bricks when the kiln has an overall height of almost 8 feet. The car is loaded to provide about 4 inches of space on each side between the green bricks and the kiln wall to provide space for the movement of part of the combustion gases down between the load and the wall as well as through the bricks. The kiln seal with the car is effected by leaving only a small space just slightly over an inch between the car frame and the kiln wall bottom. This space is sufficient to provide pressurizing of the kiln under the influence of the flame and combustion gases in the kiln. The heating of the bricks is mainly by convection from the high velocity gases passing through the brick being fired.

As the modules are temperature controlled individually, different types of charges may be fired in the modules, so long as each charge has the same type of clay. For example, in one module a Roman brick may be fired; in the next, a Norman; and in the next a hollow clay, etc. As stated above, each module contains two cars. Thus, the temperature in the kiln is controlled for each two car module. The geometry of the car loading and the kiln is sufficient so as to effectively baffle module from module and to provide for an effectively different temperature control in each of the modules.

The time schedule in burning of the brick in the kiln is controlled by the densest load to be fired. Thus, the densest load controls the time of the firing. By controlling the individual modules, the zone which reaches its temperature first may readily be cut back while the zone holding the densest load may be continued to be fired at full rate. Each module may be programmed for the particular brick in the module, and the timed temperature cycle automatically programmed to fit the particular temperature requirements, as by using pyrometers measuring the temperature to automatically control the same. Additionally, by controlling the fuel input into the modules, controlled cooling can be achieved by progressively cutting back the amount of fuel consumed at each burner. This reduced fuel consumption achieves a forced cooling and thus reduces the time schedule and provides an increased production capacity for the kiln. In the size identified above a 12 car kiln may readily be put on a 24 hour schedule where the heating and the cooling cycle is completed in a single day. The kilns are preferably gas fired, but they may be oil fired, L.P. gas, butane or the like.

The structural configuration of the kiln, with the open bottom, reduces maintenance of the brick cars since there is good, cool air circulation under the cars and around the bearings. The heat radiation shield on the car itself, the three firebrick layers, prevents excess heat from radiating down to the bearings of the car wheels. Thus, the lubrication and the maintenance of the cars is not a problem. The construction which permits circulation of the air under the kiln, also, eliminates the need for a sturdy insulated foundation. The foundation of the kiln may be any conventional floor foundation which will support the weight of the tracks with the cars and the kiln itself.

The compact design permits the kiln to be placed in a building so that it may be an all-weather unit and it is not affected by wind velocity, outside temperatures and the like. The automatic control is therefore readily achieved without expenditure of excess fuel for compensating for severe atmospheric conditions. The building may, also, be a simple shell building with a breathing roof since the stacks from the kiln, under a natural induced draft, direct the gases of combustion upwardly at a sufficient velocity for escape out of such a breathing roof without circulating these gases throughout the building.

In certain installations doors other than the car mounted door may be used. For example, conventional counterweighted guillotine, vertical lift doors may be used.

While the invention has been illustrated by reference to a particular embodiment, there is no intent to limit the spirit or the scope of the invention to the precise details so set forth except as defined in the following claims.

We claim:

1. A shuttle kiln comprising a plurality of separable modular sections joined in end-abutting and open-ended relation forming an elongated, one-car width kiln, each modular section including refractory-lined side walls and a top wall, said plurality of sections being of corresponding size and shape to accommodate brick cars positioned in said kiln, and the side walls of the kiln being supported in a common plane above floor level thereby providing a space thereunder for circulation of atmospheric air as a coolant between the coolant circulating space and upper portions of said cars, surfaces of the side walls and brick cars positioned in said kiln cooperating to form a gas-pressure holding seal, a plurality of burners mounted in a top portion of each modular section side wall with the burners in one side wall being in staggered relation to the burners in the opposite wall of the section and arranged for directing flame and products of combustion toward the opposite side wall and above the bricks loaded on the brick cars in alternate clockwise and counterclockwise circulation paths lengthwise of the kiln, an outlet for each burner positioned in a lower portion of the side wall opposite each said burner to form a top to bottom hot gas path, each outlet connected to a flue, and a fuel supply and temperature controlling means for each modular section for establishing a heating and cooling cycle therein independent of the other said modular sections.

2. A shuttle kiln according to claim 1 in which each modular section has four burners and four outlets.

3. A shuttle kiln according to claim 1 in which said side walls are metal sheath and secured to buckstays forming an integral modular unit.

4. A shuttle kiln according to claim 1 in which said burners are arranged to direct flame and combustion gases against the opposite wall so as to deflect the same through a brick load on brick cars therein.

5. A shuttle kiln according to claim 1 wherein the kiln and associated brick cars when in position therein provided a minimal open communication between adjoining modular units thereby permitting each modular unit to have independent heating and cooling.

6. A shuttle kiln according to claim 1 in which the gas-pressure holding seal includes projecting wall portions along the lower portion of the side walls coopertive with projections along the sides of the cars arranged in closely spaced proximity providing closely spaced vertical surfaces between said walls and said cars.

7. A shuttle kiln according to claim 1 in which each outlet is positioned in said side walls at a level approximating the bottom of the load of bricks on the brick cars.

8. A shuttle kiln according to claim 1 in which each flue has an open bottom and an open top.

9. A shuttle kiln according to claim 1 in which each said flue has an open bottom below its associated outlet and above the flool of the kiln.

10. A shuttle kiln comprising a plurality of separable modular sections joined in end-abutting relation forming an elongated, one-car width kiln, each modular section including refractory-lined side walls and a top wall secured to and supported by spaced buckstays and arranged for movement on a modular unit, said plurality of sections being of corresponding size and shape to accommodate brick cars positioned in said kiln, said buckstays extending below said side walls and supporting said walls in a common plane above floor level thereby providing a space thereunder for circulation of atmospheric air as a coolant between the coolant circulating space and upper portions of said cars, a plurality of burners mounted in a top portion of each modular section side wall with the burners in one side wall being in staggered relation to the burners in the opposite wall of the section for directing flame and products of combustion toward the opposite side wall and above the bricks loaded on the brick cars in alternate clockwise and counterclockwise circulation paths lengthwise of the kiln, an outlet for each burner positioned in a lower portion of the side wall opposite each said burner to form a top to bottom hot gas path, and a separate flue connected to each said outlet.

11. A shuttle kiln comprising a plurality of separable modular sections joined in end-abutting and open-ended relation forming an elongated, one-car width kiln, each modular section including refractory-lined side walls and a top wall, said plurality of sections being of corresponding size and shape to accommodate brick cars positioned in said kiln, and the side walls of the kiln being supported in a common plane above floor level thereby providing a space thereunder for circulation of atmospheric air as a coolant between the coolant circulating space and upper portions of said cars, a set of car tracks extending through the kiln and beyond each end thereof, surfaces of the side walls and brick cars positioned in said kiln cooperating to form a gas pressure holding seal, a plurality of burners mounted in a top portion of each modular section side wall with the burners in one side wall being in staggered relation to the burners in the opposite wall of the section for directing flame and products of combustion toward the opposite side wall and above the bricks loaded on the brick cars in alternate clockwise and counterclockwise circulation paths lengthwise of the kiln, an outlet for each burner positioned in a lower portion of the side wall opposite each said burner to form a top to bottom hot gas path, each outlet connected to a flue, and a closure member for each end of the kiln mounted for travel along the car tracks to open and close the ends of the kiln.

12. A shuttle kiln comprising a plurality of separable modular sections joined in end-abutting and open-ended relation forming an elongated, one-car width kiln, each modular section including refractory-lined side walls and a top wall, said plurality of sections being of corresponding size and shape to accommodate brick cars positioned in said kiln, and the side walls of the kiln being supported in a common plane above floor level thereby providing a space thereunder for circulation of atmospheric air as a coolant between the coolant circulating space and upper portions of said cars, a plurality of burners mounted in a top portion of each modular section side wall with the burners in one side wall being in staggered relation to the burners in the opposite wall of the section and arranged for injecting fuel and air under pressure along a substantially horizontal path above the bricks to be burned in alternate clockwise and counterclockwise circulation paths lengthwise of the kiln, means in the lower portion of the kiln forming a gas pressure holding seal, an outlet for each burner positioned in a lower portion of the side wall opposite thereto to form a top to bottom hot gas path, and a flue connected to each outlet for withdrawing products of combustion from each circulating path.

13. A shuttle kiln according to claim 12 in which each outlet is in non-alined relation to its associated burner lengthwise of the kiln so as to induce a top to bottom diagonal flow of the products of combustion through the bricks to be burned.

14. A shuttle kiln according to claim 12 including means for progressively increasing secondary air to selected series of burners of the kiln to progressively decrease the temperature of selected series of cars in the kiln.

15. A shuttle kiln according to claim 12 in which the top surfaces of the stack of bricks on the cars are in vertically spaced relation to the top of the kiln to provide a combustion space of substantial vertical extent through which the fuel is injected by the burners.

16. A shuttle kiln comprising a plurality of separable modular sections joined in end-abutting relation forming an elongated, one-car width kiln, each modular section including refractory-lined side walls and a top wall, said plurality of sections being of corresponding size and shape to accommodate brick cars positioned in said kiln, said walls secured to and supported by spaced partial buckstays at each end and at least one intermediate full buckstay intermediate the ends, said buckstays being joined at their top portions by interconnecting members extending along the lengthwise extent of the modular section and at their bottom portions by laterally extending channel members and spaced rails supported on and interconnecting said channel members so as to form an integral box-like assembly for movement as a modular unit, said buckstays extending below said side walls and supporting said walls in a common plane above floor level thereby providing a space thereunder for circulation of atmospheric air as a coolant between the coolant circulating space and upper portions of said cars, a plurality of burners mounted in a top portion of each modular section side wall with the burners in one side wall being in staggered relation to the burners in the opposite wall of the section for directing flame and products of combustion toward the opposite side wall and above the bricks loaded on the brick cars in alternate clockwise and counterclockwise circulation paths lengthwise of the kiln, an outlet for each burner positioned in a lower portion of the side wall opposite each said burner to form a top to bottom hot gas path, a separate flue connected to each said outlet, and a fuel supply and temperature controlling means for each modular section for establishing a heating and cooling cycle therein independent of the other said modular sections.

17. A shuttle kiln comprising a plurality of separable modular sections joined in end-abutting relation forming an elongated, one-car width kiln, each modular section including refractory-lined side walls and a top wall, said plurality of sections being of corresponding size and shape to accommodate brick cars positioned in said kiln, said walls secured to and supported by spaced partial buckstays at each end and at least one intermediate full buckstay intermediate the ends, said buckstays being joined at their top portions by interconnecting members extending along the lengthwise extent of the modular section and at their bottom portions by laterally extending channel members and spaced rail supported on and interconnecting said channel members so as to form an integral box-like assembly for movement as a modular unit, said buckstays extending below said side walls and supporting said walls in a common plane above floor level thereby providing a space thereunder for circulation of atmospheric air as a coolant between the coolant circulating space and upper portions of said cars, a plurality of burners mounted in a top portion of each modular section side wall with the burners in one side wall being in staggered relation to the burners in the opposite wall of the section for directing flame and products of combustion toward the opposite side wall and above the bricks loaded on the brick cars in alternate clockwise and counterclockwise circulation paths lengthwise of the kiln, an outlet for each burner positioned in a lower portion of the side wall opposite each said burner to form a top to bottom hot gas path, a separate flue connected to each said outlet, and a fuel supply and temperature controlling means for each modular section inclusive of a manifold line for transporting air and fuel to the burners for each modular section supported from said top interconnecting members and having end portions adapted for interconnection to an adjoining similar modular section manifold line and valve means for shutting off the air and gas to the manifold of each modular section for establishing a heating and cooling cycle therein independent of the other said modular sections.

18. A shuttle kiln comprising a plurality of separable modular sections joined in end-abutting and open-ended relation forming an elongated, one-car width kiln, each modular section including refractory-lined side walls and a top wall, said plurality of sections being of corresponding size and shape to accommodate brick cars positioned in said kiln, and the side walls of the kiln being supported in a common plane above floor level thereby providing a space thereunder for circulation of atmospheric air as a coolant between the coolant circulating space and upper portions of said cars, surfaces of the side walls and brick cars positioned in said kiln cooperating to form a gas-pressure holding seal, each of said brick cars including a flat bed and supporting peripheral uprights, at least two layers of insulating bricks superimposed one on the other positioned on said flat bed, said at least two layers being laid flat and the bricks of the individual layers abutting its neighbors and lying within said peripheral uprights, an overhanging layer of insulating bricks mounted on said at least two layers extending beyond the sides of the car and lying flat, an upright layer of insulating bricks spacedly mounted on said overhanging layer and arranged to support a latticed load of bricks for firing thereon, a plurality or burners mounted in a top portion of each modular section side wall with the burners in one side wall being in staggered relation to the burners in the opposite wall of the section and arranged for directing flame and products of combustion toward the opposite side wall and above the bricks loaded on the brick cars in alternate clockwise and counterclockwise circulation paths lengthwise of the kiln, an outlet for each burner positioned in a lower portion of the side wall opposite each said burner to form a top to bottom hot gas path, each outlet connected to a flue, and a fuel supply and temperature controlling means for each modular section for establishing a heating and cooling cycle therein independent of the other said modular sections.

References Cited

UNITED STATES PATENTS

| | | | |
|---|---|---|---|
| 960,286 | 6/1910 | Drayton | 25—142 |
| 981,109 | 1/1911 | Rappold | 25—142 |
| 1,041,006 | 10/1912 | Boyce | 25—142 |
| 1,054,040 | 2/1913 | Scott | 25—142 |
| 1,075,904 | 10/1913 | Drayton | 25—142 |
| 1,628,273 | 5/1927 | Richardson | 25—142 |
| 1,701,223 | 2/1929 | Bergman | 25—142 |
| 1,960,572 | 5/1934 | Butterworth et al. | 25—142 XR |
| 2,003,450 | 6/1935 | Ladd | 25—142 |
| 2,137,091 | 11/1938 | McDougal. | |
| 2,496,170 | 1/1950 | Mann | 25—142 XR |
| 2,654,910 | 10/1953 | McDonald | 18—6 XR |
| 2,885,728 | 5/1959 | Campbell | 18—6 XR |
| 3,158,364 | 11/1964 | Cremer et al. | 263—28 |

WILLIAM J. STEPHENSON, *Primary Examiner.*